(12) United States Patent
Reddy et al.

(10) Patent No.: US 11,743,779 B2
(45) Date of Patent: Aug. 29, 2023

(54) CO-EXISTENCE MECHANISM FOR DOWNLOADABLE VOICE APPLICATION CLIENT

(71) Applicant: RELIANCE JIO INFOCOMM USA, INC., Frisco, TX (US)

(72) Inventors: Gautam G. Reddy, Plano, TX (US); Mathew Oommen, Frisco, TX (US); Pallavur A. Sankaranaraynan, Frisco, TX (US); Chao Kan, Frisco, TX (US)

(73) Assignee: RELIANCE JIO INFOCOMM USA, INC., Frisco, TX (US)

( * ) Notice: Subject to any disclaimer, the term of this patent is extended or adjusted under 35 U.S.C. 154(b) by 75 days.

(21) Appl. No.: 16/277,159

(22) Filed: Feb. 15, 2019

(65) Prior Publication Data
US 2019/0182719 A1 Jun. 13, 2019

Related U.S. Application Data

(63) Continuation of application No. 15/374,909, filed on Dec. 9, 2016, now Pat. No. 10,212,627.
(Continued)

(51) Int. Cl.
*H04W 36/00* (2009.01)
*H04W 60/00* (2009.01)
(Continued)

(52) U.S. Cl.
CPC .......... *H04W 36/0022* (2013.01); *G06F 8/61* (2013.01); *H04L 65/1059* (2013.01);
(Continued)

(58) Field of Classification Search
CPC . H04L 65/1083; H04L 65/1059; H04L 67/34; H04L 65/1073; H04W 60/00; H04W 36/0022; G06F 8/61
See application file for complete search history.

(56) References Cited

U.S. PATENT DOCUMENTS 7,443,967 B1 * 10/2008 Silver .................. H04M 11/002
379/106.09
8,208,410 B1 * 6/2012 Hagendorf .......... H04L 65/1069
379/215.01
(Continued)

FOREIGN PATENT DOCUMENTS

CN 104113536 A * 10/2014
CN 108702320 10/2018
(Continued)

OTHER PUBLICATIONS

The International Search Report and Written Opinion dated Apr. 3, 2017 by the European Patent Office for International Application No. PCT/US2016/066006, 9 pages.
(Continued)

*Primary Examiner* — Mehmood B. Khan
(74) *Attorney, Agent, or Firm* — Jackson Walker LLP; Christopher J. Rourk

(57) ABSTRACT

A method for call processing comprising processing telecommunications data with an Over-The-Top (OTT) client on a handset, determining whether to use a voice over long term evolution (VoLTE) client or a WiFi client in response to an operational change and reconfiguring the handset to use the VoLTE client or the WiFi client if the determination is made to use the VoLTE client or the WiFi client, respectively.

18 Claims, 4 Drawing Sheets

Related U.S. Application Data

(60) Provisional application No. 62/266,325, filed on Dec. 11, 2015.

(51) Int. Cl.
  *H04L 67/00* (2022.01)
  *H04L 65/1073* (2022.01)
  *H04L 65/1083* (2022.01)
  *H04L 65/1059* (2022.01)
  *G06F 8/61* (2018.01)

(52) U.S. Cl.
  CPC ...... *H04L 65/1073* (2013.01); *H04L 65/1083* (2013.01); *H04L 67/34* (2013.01); *H04W 60/00* (2013.01)

(56) References Cited

U.S. PATENT DOCUMENTS

| | | | |
|---|---|---|---|
| 9,264,304 B2 | 2/2016 | Smith et al. | |
| 9,565,615 B2 | 2/2017 | Bharadwaj | |
| 9,602,556 B1 | 3/2017 | Cham | |
| 9,628,572 B2 | 4/2017 | Smith et al. | |
| 9,888,044 B2 | 2/2018 | Reddy et al. | |
| 9,959,425 B2 | 5/2018 | Singh et al. | |
| 10,004,021 B2 | 6/2018 | Pawar et al. | |
| 10,027,769 B2 | 7/2018 | Smith et al. | |
| 10,051,053 B2 | 8/2018 | Pandit et al. | |
| 10,102,362 B2 | 10/2018 | Singh et al. | |
| 10,123,360 B2 | 11/2018 | Pandit et al. | |
| 10,178,136 B2 | 1/2019 | Jayaraman et al. | |
| 10,178,554 B2 | 1/2019 | Pawar et al. | |
| 10,200,928 B2 | 2/2019 | Jamadagni et al. | |
| 10,212,627 B2 | 2/2019 | Reddy et al. | |
| 10,299,121 B2 | 5/2019 | Jamadagni et al. | |
| 2004/0192282 A1 | 9/2004 | Vasudevan | |
| 2005/0135342 A1* | 6/2005 | Kim | H04M 7/0057 370/352 |
| 2005/0176421 A1 | 8/2005 | Matenge et al. | |
| 2007/0189475 A1* | 8/2007 | Pearson | H04M 1/2757 379/142.01 |
| 2010/0208631 A1 | 8/2010 | Zhang et al. | |
| 2012/0296784 A1 | 11/2012 | Connor | |
| 2013/0080538 A1 | 3/2013 | McEachern et al. | |
| 2013/0223607 A1* | 8/2013 | Hillier | H04M 3/02 379/215.01 |
| 2014/0071889 A1* | 3/2014 | Aksu | H04L 65/1069 370/328 |
| 2014/0171084 A1* | 6/2014 | Chandler | H04M 7/1275 455/436 |
| 2014/0185521 A1 | 7/2014 | Aksu et al. | |
| 2014/0185526 A1 | 7/2014 | Aksu et al. | |
| 2014/0208360 A1 | 7/2014 | Kardatzke | |
| 2014/0307549 A1 | 10/2014 | Kotecha et al. | |
| 2014/0315524 A1* | 10/2014 | Sinha | H04M 3/4288 455/414.1 |
| 2014/0372557 A1 | 12/2014 | Buckley | |
| 2015/0029925 A1 | 1/2015 | Mantin | |
| 2015/0131650 A1 | 5/2015 | Shuman et al. | |
| 2015/0350983 A1* | 12/2015 | Kwok | H04L 65/1016 370/331 |
| 2015/0358478 A1 | 12/2015 | Arazi et al. | |
| 2015/0378558 A1 | 12/2015 | Smith et al. | |
| 2015/0381562 A1 | 12/2015 | Efrati et al. | |
| 2016/0014276 A1* | 1/2016 | Kotreka | H04M 3/54 455/417 |
| 2016/0105551 A1 | 4/2016 | Rameil-Green | |
| 2016/0105811 A1 | 4/2016 | Khurana et al. | |
| 2016/0142447 A1* | 5/2016 | Mufti | H04L 65/1104 370/259 |
| 2016/0142536 A1* | 5/2016 | Bendi | H04L 67/148 455/411 |
| 2016/0156703 A1 | 6/2016 | Yang et al. | |
| 2016/0156775 A1 | 6/2016 | Waisel et al. | |
| 2016/0182734 A1 | 6/2016 | Bianco et al. | |
| 2016/0192267 A1* | 6/2016 | Zhang | H04W 36/30 370/331 |
| 2016/0234749 A1* | 8/2016 | Singh | H04W 36/0022 |
| 2016/0286438 A1* | 9/2016 | Weingertner | H04M 15/56 |
| 2016/0337513 A1 | 11/2016 | Seward et al. | |
| 2016/0353333 A1 | 12/2016 | Jamadagni et al. | |
| 2016/0373944 A1* | 12/2016 | Jain | H04L 43/08 |
| 2017/0006342 A1 | 1/2017 | Nagaraja Rao et al. | |
| 2017/0034744 A1 | 2/2017 | Kwok et al. | |
| 2017/0034763 A1 | 2/2017 | Reddy et al. | |
| 2017/0078171 A1* | 3/2017 | Tapia | H04W 24/08 |
| 2017/0078484 A1* | 3/2017 | Seward | H04M 3/465 |
| 2017/0086155 A1 | 3/2017 | Naim et al. | |
| 2017/0093749 A1 | 3/2017 | Hoffman | |
| 2017/0094574 A1* | 3/2017 | Singh | H04W 36/245 |
| 2017/0118707 A1* | 4/2017 | Bharadwaj | H04L 65/1096 |
| 2017/0180550 A1* | 6/2017 | Geo | H04M 7/0042 |
| 2017/0195880 A1 | 7/2017 | Jamadagni et al. | |
| 2017/0273046 A1 | 9/2017 | Piscopo, Jr. | |
| 2017/0289783 A1 | 10/2017 | Bergius et al. | |
| 2017/0325120 A1 | 11/2017 | Szilagyi et al. | |
| 2018/0007519 A1 | 1/2018 | Jamadagni et al. | |
| 2018/0034157 A1 | 2/2018 | Shah et al. | |
| 2018/0035249 A1 | 2/2018 | Lam et al. | |
| 2018/0054760 A1* | 2/2018 | Chun | H04W 76/27 |
| 2018/0063251 A1 | 3/2018 | Mahendra et al. | |
| 2018/0070390 A1 | 3/2018 | Pawar et al. | |
| 2018/0124111 A1 | 5/2018 | Gupta et al. | |
| 2018/0146359 A1 | 5/2018 | Pawar et al. | |
| 2018/0159905 A1 | 6/2018 | Reddy et al. | |
| 2018/0262931 A1 | 9/2018 | Gupta et al. | |
| 2018/0288659 A1 | 10/2018 | Jamadagni et al. | |
| 2018/0324262 A1 | 11/2018 | Smith et al. | |
| 2018/0365239 A1 | 12/2018 | Bharati et al. | |
| 2019/0007870 A1 | 1/2019 | Gupta et al. | |
| 2019/0052603 A1* | 2/2019 | Wu | H04L 65/1059 |
| 2019/0110301 A1 | 4/2019 | Gupta et al. | |
| 2019/0182719 A1* | 6/2019 | Reddy | H04L 65/1083 |

FOREIGN PATENT DOCUMENTS

| | | | |
|---|---|---|---|
| CN | 108702662 | 10/2018 | |
| CN | 113271639 A * | 8/2021 | |
| KR | 2018116715 A * | 10/2018 | ........ H04M 1/72519 |
| WO | WO-0219736 A2 * | 3/2002 | ............ H04W 36/14 |
| WO | WO-2005057795 A2 * | 6/2005 | ............. H04W 4/16 |
| WO | WO-2010075126 A2 * | 7/2010 | ............. H04L 69/08 |
| WO | 2015/184418 | 3/2015 | |
| WO | 2015/128880 | 9/2015 | |
| WO | 2015/181833 | 12/2015 | |
| WO | 2016/038563 | 3/2016 | |
| WO | WO-2016196266 A1 * | 12/2016 | ............. H04W 8/06 |
| WO | 2018/060839 | 4/2018 | |
| WO | 2018/065864 | 4/2018 | |
| WO | 2018/078503 | 5/2018 | |
| WO | 2018/225024 | 12/2018 | |
| WO | 2018/235025 | 12/2018 | |
| WO | 2019/034979 | 2/2019 | |
| WO | 2019/043638 | 3/2019 | |
| WO | 2019/049052 | 3/2019 | |

OTHER PUBLICATIONS

Notification of Transmittal of International Preliminary Report on Patentability for PCT/US2016/066006, dated Jun. 21, 2018 by WIPO, containing the Written Opinion of the European Patent Office, 8 pages.

* cited by examiner

CO-EXISTENCE MECHANISM FOR DOWNLOADABLE VOICE APPLICATION CLIENT

CROSS-REFERENCE TO RELATED APPLICATIONS

The present application is a continuation of U.S. patent application Ser. No. 15/374,909 filed Dec. 9, 2016, which claims priority to and benefit of U.S. Provisional Patent Application No. 62/266,325, filed Dec. 11, 2015, which is hereby incorporated by reference for all purposes as if set forth herein in its entirety.

TECHNICAL FIELD

The present disclosure relates generally to telecommunications, and more specifically to a co-existence mechanism for an. Over-The-Top (OTT) downloadable voice application client and native embedded Voice over LTE (VoLTE) client or Voice over WiFi (VoWiFi) client in a mobile operator network.

BACKGROUND OF THE INVENTION

Systems and methods for call setup and routing are known. In a system that includes a cellular services provider that use the Long Term Evolution (LTE) standard or for devices that are compatible with WiFi or other network standards, an OTT downloadable voice client can be installed by the user, where OTT refers to voice and data that is transmitted over the Internet packet switched network and without carrier involvement in quality of service or call management, but these downloadable voice clients are not compatible with network calls.

SUMMARY OF THE INVENTION

A system and method for call processing is disclosed that includes processing telecommunications data with an OTT client on a handset, such as by downloading the client, configuring the client, and sending or receiving a call with the client. It is then determined whether to use a VoLTE client or a WiFi client in response to an operational change. The handset is reconfigured to use the VoLTE client or the WiFi client if the determination is made to use the VoLTE client or the WiFi client, respectively.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
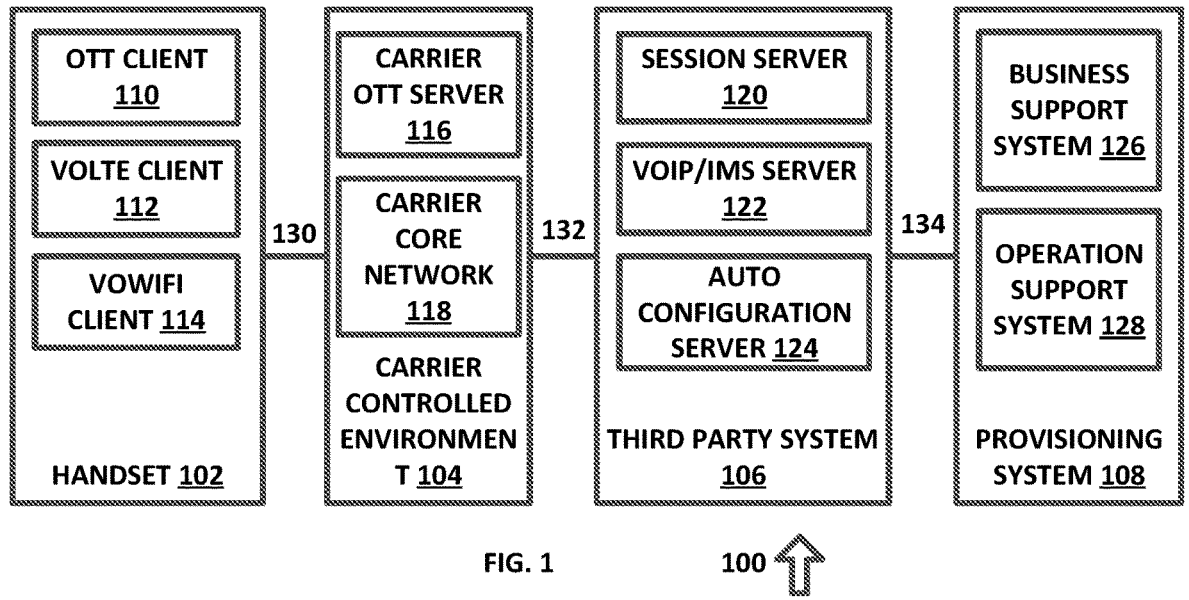
FIG. 1 is a diagram of a system for providing third-party messaging, voice and video calling clients, in accordance with an exemplary embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

Today, there are many OTT third party client applications on the market that can provide voice, messaging and video capabilities to mobile customers. Some third party applications even offer an integrated dialer user interface to provide a seamless voice calling experience to end users, as if they are calling from a native embedded voice dialer on the handsets. These third party systems suffer from many problems, primarily in regards to service reliability and support. A cellular service provider is in a position to offer better service reliability and support in conjunction with an OTT client application, by integrating the OTT client application functionality with a native VoLTE client or VoWiFi client that is provided with the handset, either by the original equipment manufacturer (OEM) or the cellular service provider, such that the handset can switch seamlessly between different media and system functionalities. In this manner, a user making a call or using other services will not suffer interruption and will have greater satisfaction and security than can be offered by other OTT service providers. The OTT application can be offered by the cellular service provider, the cellular service provider can allow OTT application providers to interact with the cellular service provider's carrier controlled environment, or other configurations can be used to provide the disclosed system functionality.

FIG. 1 is a diagram of a system 100 for providing third-party messaging, voice and video calling clients, in accordance with an exemplary embodiment of the present disclosure. System 100 allows user devices to communicate with an application server, such as one that is located in a third party controlled environment or that can be hosted by the cellular services provider, using the data network provided by the wireless operators as underlying infrastructure.

System 100 includes handset 102, which can be a user device such as a smart phone, a smart watch, a tablet computer or other suitable devices that are used to communicate audio data, video data or other suitable data. Handset 102 includes OTT client 110, VoLTE, client 112 and VoWiFi client 114, each of which can be implemented in hardware or a suitable combination of hardware and software. OTT client 110 can be provided by a third party or the cellular service provider, but VoLTE client 112 and VoWiFi client 114 are typically provided by the OEM or the cellular service provider.

Handset 102 is coupled to carrier controlled environment 104 over communications medium 132, which can be a WIFI network, an LTE network, an Internet network, an Ethernet network, other suitable communications media or a suitable combination of such communications media. Carrier controlled environment 104 includes carrier OTT server 116 and carrier core network 118, each of which can be implemented in hardware or a suitable combination of hardware and software. Carrier OTT server 116 can provide OTT client 110 services when those services are hosted by the cellular services provider, or can provide support for third party OTT service providers when they are authorized by the cellular services provider. Carrier core network 118 provides core network functionality, including base station radio network functionality, base station controller (BSC) functionality, mobile switching center (MSC) functionality and other carrier core network functionality.

Carrier controlled environment 104 is coupled to third party system. 106 over communications medium 134, which can be a tier 1 network, a tier 2 network, a tier 3 network or other suitable communications media, as discussed above. Third party system 106 includes session server 120, voice over Internet protocol (VOIP) and IMS server 122, auto configuration server 124 and other suitable servers that are used to support OTT client 110, each of which can be implemented in hardware or a suitable combination of hardware and software.

Third party system 106 is coupled to provisioning system 108 over communications medium 136, which can be a tier 1 network, a tier 2 network, a tier 3 network or other suitable communications media, as discussed above. Third party system 106 includes business support system 126 and operation support system 128, each of which can be implemented in hardware or a suitable combination of hardware and software.

System 100 can be implemented in accordance with the 2G/3G/4G cellular network, a WiFi data network or other suitable networks as described above, and is configured to operation in a manner that is transparent to OTT client 110, VoLTE client 112 or VoWiFi client 114. Handset 102 can communicate with third party system 106 or other suitable systems using a virtual private network, encryption for security, or in other suitable manners.

A cellular operator can use carrier controlled environment 104 or other suitable systems to provide OTT messaging, voice and video calling applications using OTT client 110, VoLTE client 112 and VoWiFi client 114, by coupling those clients to compete with third party application providers.

System 100 provides an integrated solution with OTT client 110, VoLTE client 112 and VoWiFi client 114 of handset 102, using carrier controlled environment 104, third party system 106 and provisioning system. 108 and their associated component systems. In system 100, handset 102 uses the same Mobile Station International Subscriber Directory Number (MSISDN), which is effectively a telephone number that uniquely identifies handset 102, to make and receive calls, whether the call is going through the cellular voice network, such as carrier controlled environment 104, using a traditional original equipment manufacturer (OEM) client such as VoLTE client 112, or through the cellular network or a wireless data network, using OTT client 110 or VoWiFi client 114. A call can be initiated from any suitable control, regardless of whether it is a control from the OEM or one that is provided by an application. For example, an OEM device can be provided with a green "talk" button that can be used to instantiate a data communications session, and OTT client 110, VoLTE client. 112 and/or VoWiFi client 114 can intelligently choose the correct communications medium based on predefined criteria, by implementing the algorithmic controls disclosed herein or other suitable variations of those controls that fall within the scope of the claims.

The disclosed architecture provides for improved session mobility over prior art systems, which typically do not provide for any session mobility at all. Because the same core network is used, a transition from a call that is placed over a WiFi network to a call on the LTE network can be accomplished, because the different calling systems can be coordinated. Thus, when a user places a call over a WiFi network, such as when the user is at home and is using a secure WiFi network in order to place a call using a less expensive calling mechanism, the user can then leave the secure WiFi environment and continue the call in the LTE environment without dropping the call.

In addition, a handset 102 that does not have built-in voice calling capabilities, such as a tablet computer, can be connected to the cellular network for services such as messaging, voice and video calling, and can receive an officially allocated MSISDN that allows the handset 102 to be located by a caller using existing infrastructure systems, such as the cellular service provider BSCs and MSC, and does not require the caller to have a third party application or to be configured to communicate over the third party application, such as to know the called party's unique identifier for that third party application.

Using a cellular call processing system service such as instant messaging presents an implementation challenge when end users download OTT client 110 to a handset 102 that already has an OEM/native embedded VoLTE client 112 or VoWiFi client 114 installed. Since both OTT client 110 and VoLTE client 112 or VoWiFi client 114 register into the same cellular IMS system using the same MSISDN number, an additional co-existence mechanism is needed at handset 102 to provide for seamless transitioning, reliability and security, as well as to provide and control the terms and conditions by which handset 102 will interact with the cellular system, to allow the cellular system to route a received call and to determine which client to use for the end users to make a call. For example, if a handset 102 is in an LTE service zone, a caller needs to be able to locate that handset, and then if the handset 102 transits into a WiFi zone during that call, the handset 102 needs to be able to maintain the call without service interruption. The determination of priority and all associated signaling and routing mechanisms related to the mobile cellular core IMS networks to make the end customer's voice calling experience seamless is provided by the present disclosure.

In order to accomplish this objective, VoLTE client 112 or VoWiFi client 114 can take priority over OTT client 110, and OTT client 110 can detect and disengage when VoLTE client 112 or VoWiFi client 114 is registered with the same user in the mobile network. OTT client 110 over WiFi access can be registered at the same time when VoLTE client 112 has also registered. However, whenever VoWiFi client 114 is registered, OTT client 110 can either not register, de-register or can take other appropriate actions to prevent misoperation.

Figure 2:
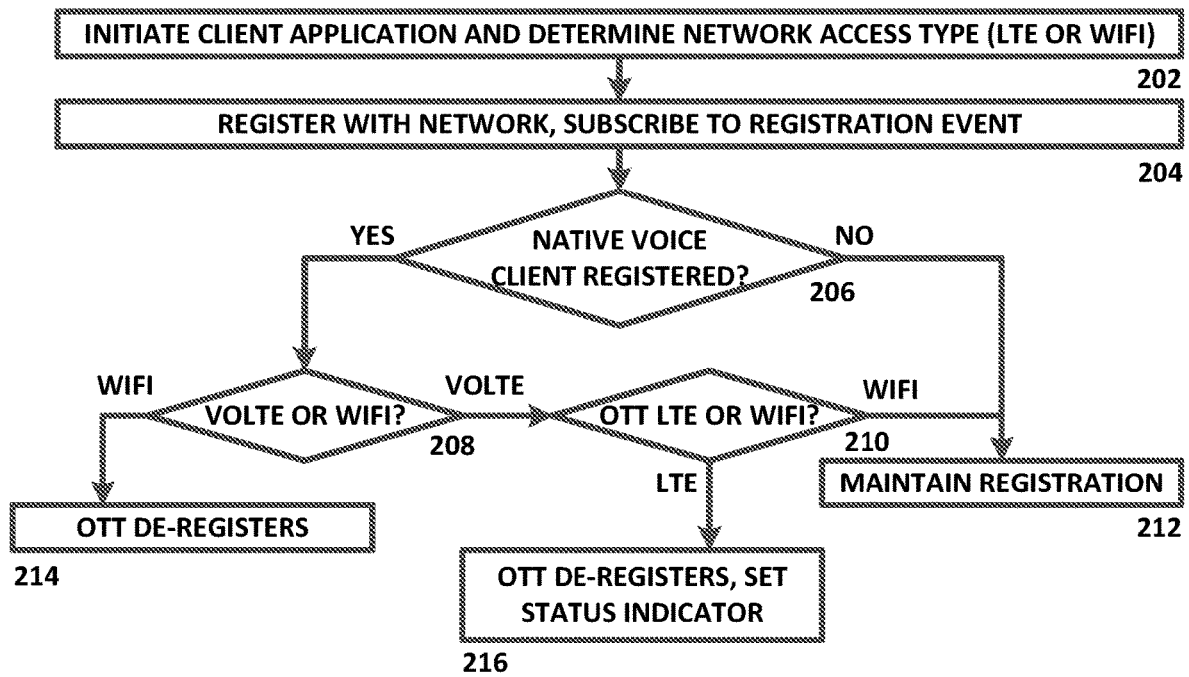
FIG. 2 is a diagram of an algorithm for initial registration of an OTT client, in accordance with an exemplary embodiment of the present disclosure.

FIG. 2 is a diagram of an algorithm 200 for initial registration of an OTT client, in accordance with an exemplary embodiment of the present disclosure. Algorithm 200 can be implemented in hardware or a suitable combination of hardware and software.

Algorithm 200 can be utilized when an end user launches an OTT client on the handset where a native VoLTE client or VoWiFi client have already registered, where the handset is an LTE-only handset and has no voice capability, or in other suitable manners. After an identification of the associated system components, those system components utilize the disclosed algorithm to implement the calling environment. Algorithm 200 is exemplary, and other suitable steps, processes, procedures or applications can be utilized in conjunction with the associated process steps.

Algorithm 200 begins at 202, where a client OTT application is initiated on a handset, such as in conjunction with an associated OTT server, carrier core network components, a session server, a VOIP/IMS server, an auto configuration server, a business support system, an operation support system or other suitable systems, and a network access type is determined, such as an LTE or WiFi network. In one exemplary embodiment, a system such as system 100 can be utilized, and a device such as handset 102 using OTT client 110 operating in conjunction with other disclosed system components can be used to determine the network access type, or other suitable processes can also or alternatively be used. The OTT client will typically be configured by the OTT server, but can also or alternatively be configured by the carrier core network components, a session server, a VOIP/IMS server, an auto configuration server, a business support system, an operation support system or other suitable systems, and location of this algorithmic function in any of those system components is contemplated by the present disclosure. These components can also or alternatively be used to implement the algorithmic components of the disclosed algorithms, as would be understood by one of ordinary skill, and will not be repeated for each algorithm component. For example, a business support system 126, an operation support system 128 or other systems can be involved with the initiation of the OTT client, and may be called as part of the initiation process, unlike the prior art, which might only utilize a session server, a VOIP/IMS server, and an auto configuration server to configure the OTT client. By coordinating the initiation of the OTT client with the other system components, the remaining algorithmic steps can be performed. The algorithm then proceeds to 204.

At 204, the client application registers with the mobile network and subscribes to a registration event to get one network notifications. In exemplary embodiment, the subscription can be performed using carrier OTT server 116, carrier core network 118, business support systems 126, operation support system 128 or other suitable system components as described herein. The algorithm then proceeds to 206.

At 206, it is determined whether a native voice client has already been registered for the same user. For example, a native voice client such as VoLTE client 112 or VoWiFi client 114 of handset 102 can already have been registered, or other suitable native voice clients can already have been registered, and this is determined, such as at handset 102, carrier core network 118, business support systems 126, operation support system 128 or other suitable system components as described herein If it is determined that a native voice client has not registered, the algorithm proceeds to 212 where the current registration of the OTT client is maintained. Otherwise the algorithm proceeds to 208.

At 208, it is determined whether the native voice client is a VoLTE client, such as VoLTE client 112, or a VoWiFi client, such as VoWiFi client 114. If it is determined that the native voice client is a VoWiFi client, such as at handset 102, carrier core network 118, business support systems 126, operation support system 128 or other suitable system components as described herein, the algorithm proceeds to 214 where the OTT client deregisters. Otherwise, the algorithm proceeds to 210.

At 210, it is determined whether the native voice client is using LTE access or WiFi access, such as at handset 102, carrier core network 118, business support systems 126, operation support system 128 or other suitable system components as described herein. Likewise, other suitable determinations can be made, based on the type of wireless access available at the time or in the specific geographic location. If it is determined that the access mode is WiFi, the algorithm proceeds to 212 where the OTT client is maintained. Otherwise, the algorithm proceeds to 216, where the OTT client de-registers. In addition, the handset can "permanently" de-register the OTT client for LTE network access, such as by setting a suitable state variable or in other suitable manners.

Although algorithm 200 is shown in flow chart format, one of ordinary skill will understand that object oriented programming, state transition diagrams or other suitable programming paradigms can also or alternatively be used.

Figure 3:
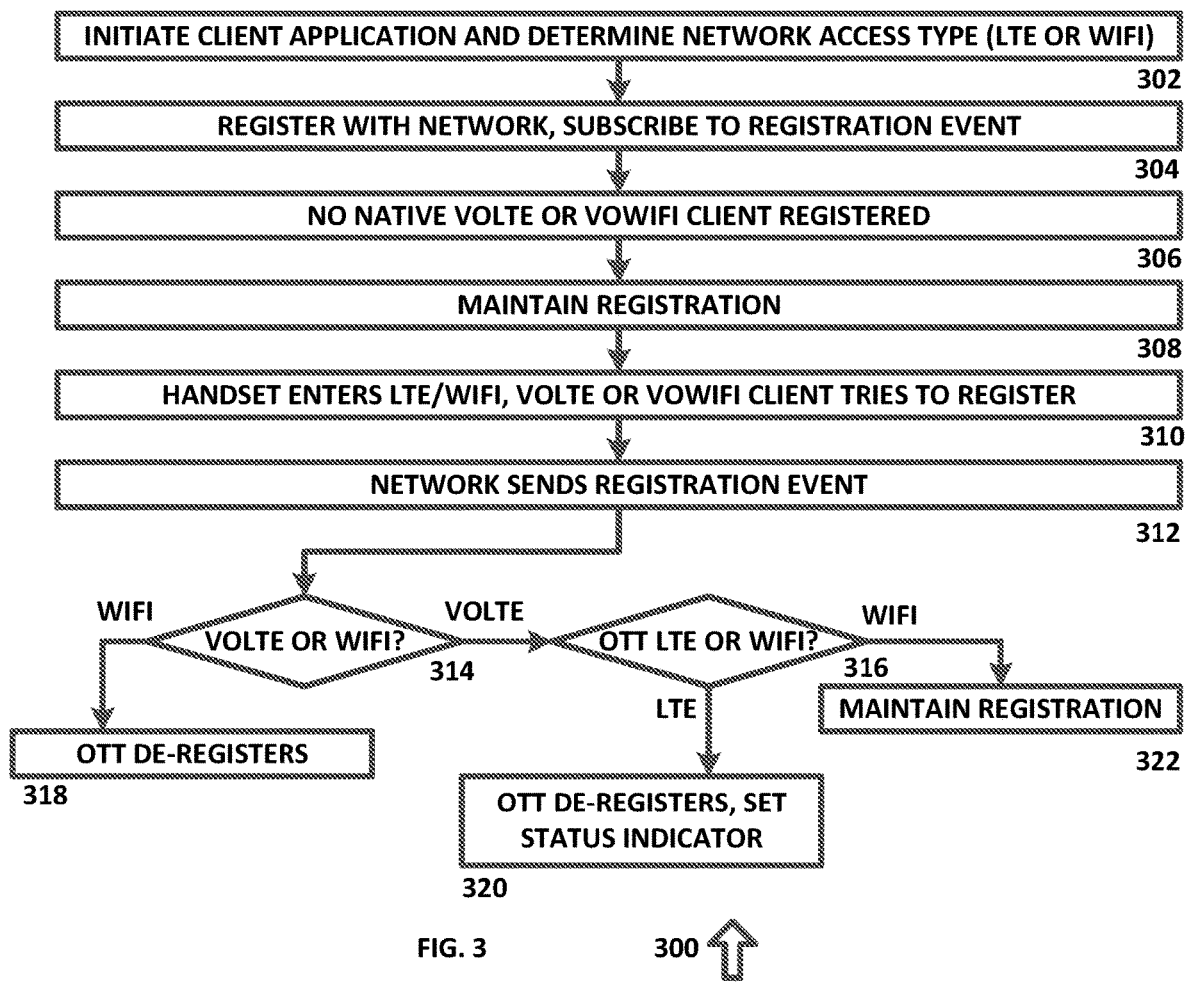
FIG. 3 is a diagram of an algorithm for registering a VoLTE client or VoWiFi client after an OTT client registers, in accordance with an exemplary embodiment of the present disclosure.

FIG. 3 is a diagram of an algorithm 300 for registering a VoLTE client or VoWiFi client after an OTT client registers, in accordance with an exemplary embodiment of the present disclosure. Algorithm 300 can be implemented in hardware or a suitable combination of hardware and software.

Algorithm 300 can be used when a client such as OTT client 110 has already registered, and the native VoLTE client or VoWiFi client enters into LTE coverage or WiFi coverage. Algorithm 300 identifies the associated system components, and algorithmic processes that are performed by those system components, using algorithms implemented in hardware or a suitable combination of hardware and software. The diagram is exemplary, and other suitable steps, processes, procedures or applications can be utilized in conjunction with the associated process steps.

Algorithm 300 begins at 302, where a client application is initiated and a network access type is determined, such as an LTE or WiFi network. In one exemplary embodiment, a system such as system 100 can be utilized, and a device such as handset 102 using OTT client 110, carrier core network 118, business support systems 126, operation support system 128 or other suitable system components as described herein can be used to determine the network access type, or other suitable processes can also or alternatively be used. The algorithm then proceeds to 304.

At 304, the client application registers with the mobile network and subscribes to a registration event to get network notifications. In one exemplary embodiment, the subscription can be performed using carrier core network 118, business support systems 126, operation support system 128 or other suitable system components as described herein. The algorithm then proceeds to 306.

At 306, it is determined that no VoLTE client or VoWiFi client has registered for the same user, such as at handset 102, carrier core network 118, business support systems 126, operation support system 128 or other suitable system components as described herein, and the algorithm proceeds to 308, where the registration is maintained. The algorithm then proceeds to 310.

At 310, the handset is moved into an LTE coverage area or a trusted Win coverage area, which can trigger the VoLTE client or the VoWiFi client to register, respectively. Registration can be performed using handset 102, carrier core network 118, business support systems 126, operation support system 128 or other suitable system components as described herein. After the registration process is initiated, the algorithm proceeds to 312.

At 312, the network sends a registration event, such as by using carrier core network 118, business support systems 126, operation support system 128 or other suitable system components as described herein, which also notifies the OTT client that the other client (the VoLTE client or the VoWiFi client) has initiated registration. The algorithm then proceeds to 314.

At 314, it is determined whether the client that is attempting to register is a VoLTE client 112 or VoWiFi client 114 of handset 102, or other suitable native voice clients can also or alternatively registered, and this can be determined at handset 102, carrier core network 118, business support systems 126, operation support system 128 or other suitable system components as described herein. If it is determined that the client is a VoWiFi client, the algorithm proceeds to 318 where the OTT client de-registers. Otherwise the algorithm proceeds to 316.

At 316, it is determined whether the native voice client, such as OTT client 110, is using LTE access or WiFi access, such as by handset 102, carrier core network 118, business support systems 126, operation support system 128 or other suitable system components as described herein. Likewise, other suitable determinations can be made, based on the type of wireless access available at the time or in the specific geographic location. If it is determined that the access mode is WiFi, the algorithm proceeds to 322 where the OTT client is maintained. Otherwise, the algorithm proceeds to 320, where the OTT client de-registers because the VoLTE client, such as VoLTE client 112, has registered. In addition, the handset can "permanently" de-register the OTT client, such as by setting a suitable state variable or in other suitable manners.

Although algorithm 300 is shown in flow chart format, one of ordinary skill will understand that object oriented programming, state transition diagrams or other suitable programming paradigms can also or alternatively be used.

Figure 4:
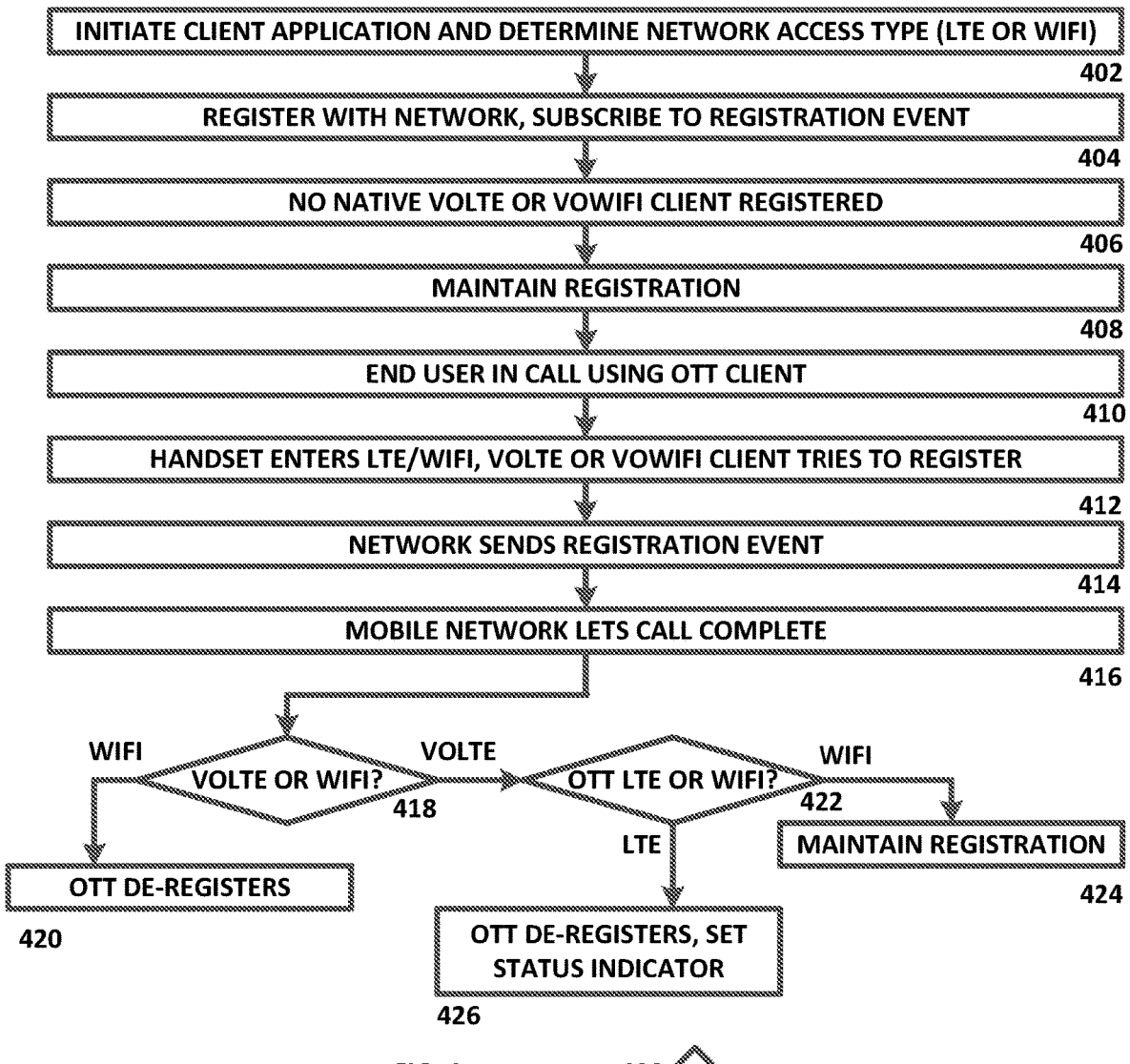
FIG. 4 is a diagram of an algorithm for registering a VoLTE client or a VoWiFi client when an OTT client has already registered and is on a voice call, in accordance with an exemplary embodiment of the present disclosure.

FIG. 4 is a diagram of an algorithm 400 for registering a VoLTE client or a VoWiFi client when an OTT client has already registered and is on a voice call, in accordance with an exemplary embodiment of the present disclosure. Algorithm 400 can be implemented in hardware or a suitable combination of hardware and software.

Algorithm 400 can be used when a client such as OTT client 110 has already registered and is on a call, and the native VoLTE client or VoWiFi client enters into LTE coverage or trusted WiFi coverage. Algorithm 400 identifies the associated system components, and algorithmic processes that are performed by those system components, using algorithms implemented in hardware or a suitable combination of hardware and software. The diagram is exemplary, and other suitable steps, processes, procedures or applications can be utilized in conjunction with the associated process steps.

Algorithm 400 begins at 402, where a client application is initiated and a network access type is determined, such as an LTE or WiFi network. In one exemplary embodiment, a system such as system 100 can be utilized, and a device such as handset 102 using OTT client 110, carrier core network 118, business support systems 126, operation support system 128 or other suitable system components as described herein can be used to determine the network access type, or other suitable processes can also or alternatively be used. The algorithm then proceeds to 404.

At 404, the client application registers with the mobile network and subscribes to a registration event to get network notifications. In one exemplary embodiment, the subscription can be performed using carrier OTT server 116, carrier core network 118, business support systems 126, operation support system 128 or other suitable system components as described herein. The algorithm then proceeds to 406.

At 406, it is determined that no VoLTE client or VoWiFi client has registered for the same user, such as using handset 102, carrier core network 118, business support systems 126, operation support system 128 or other suitable system components as described herein, and the algorithm proceeds to 408, where the registration is maintained. The algorithm then proceeds to 410.

At 410, the end user enters into a call with the OTT client. In one exemplary embodiment, the end user can place a call with the OTT client. In another exemplary embodiment, the end user can be called by a remote user using the OTT client, or other suitable processes can also or alternatively be used. The algorithm then proceeds to 412.

At 412, the handset is moved into an LTE coverage area or a trusted WiFi coverage area, which can trigger the VoLTE client or the VoWiFi client to register, respectively. After the registration process is initiated, the algorithm proceeds to 414.

At 414, the network sends a registration event, which also notifies the OTT client that the other client (the VoLTE client or the VoWiFi client) has initiated registration, such as by using carrier OTT server 116, carrier core network 118, business support systems 126, operation support system 128 or other suitable system components as described herein. The algorithm then proceeds to 416.

At 416, the mobile network determines that the call should be allowed to continue, such as using carrier OTT server 116, carrier core network 118, business support systems 126, operation support system 128 or other suitable system components as described herein. In one exemplary embodiment, the local network can determine whether a class of service allows the call to continue to completion, or other suitable processes can also or alternatively be used. The algorithm then proceeds to 418.

At 418, it is determined whether the client that is attempting to register is a VoLTE client 112 or VoWiFi client 114 of handset 102, or other suitable native voice clients can also or alternatively registered, and this can be determined at handset 102, carrier core network 118, business support systems 126, operation support system 128 or other suitable system components as described herein. If it is determined that the client is a VoWiFi client, the algorithm proceeds to 420 where the OTT client de-registers. Otherwise the algorithm proceeds to 422.

At 422, it is determined whether the native voice client, such as OTT client 110, is using LTE access or WiFi access. Likewise, other suitable determinations can be made, based on the type of wireless access available at the time or in the specific geographic location. If it is determined that the access mode is WiFi, the algorithm proceeds to 424 where the OTT client is maintained. Otherwise, the algorithm proceeds to 426, where the OTT client de-registers and the registered VoLTE client is used. In addition, the handset can "permanently" de-register the OTT client, such as by setting a suitable state variable or in other suitable manners.

Although algorithm 400 is shown in flow chart format, one of ordinary skill will understand that object oriented programming, state transition diagrams or other suitable programming paradigms can also or alternatively be used.

Figure 5:
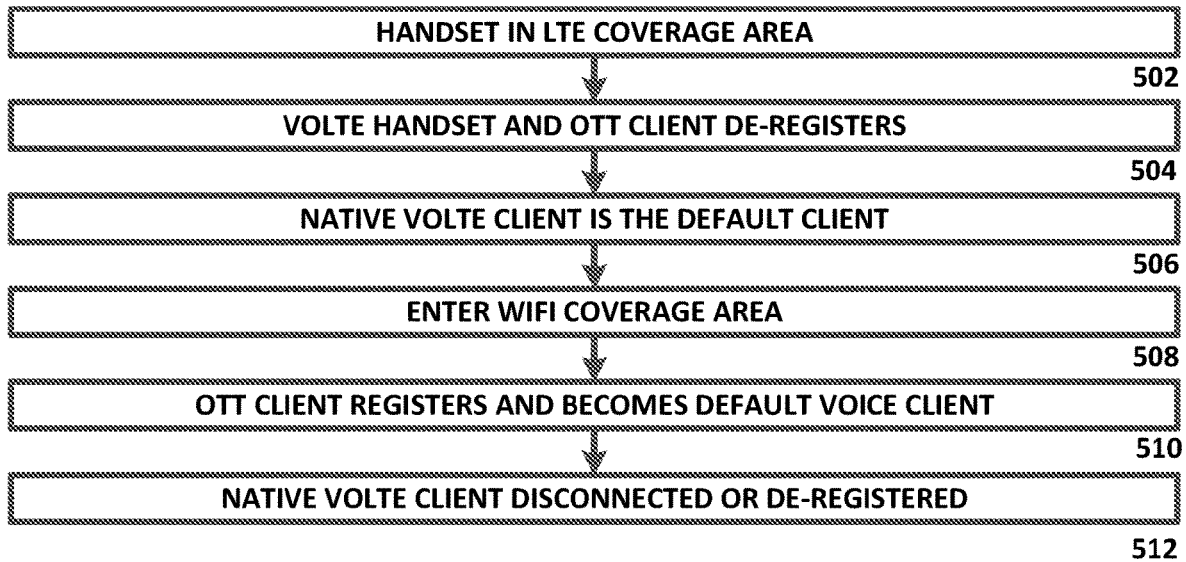
FIG. 5 is a diagram of an algorithm for supporting a transition from a native VoLTE client to an OTT client as a result of a coverage change, in accordance with an exemplary embodiment of the present disclosure.

FIG. 5 is a diagram of an algorithm for supporting a transition from a native VoLTE client to an OTT client as a result of a coverage change, in accordance with an exemplary embodiment of the present disclosure.

Algorithm 500 can be used when a native VoLTE handset without VoWiFi capability moves out of the LTE coverage area into the WiFi coverage area. In this scenario, the OTT client acts like the native VoWiFi client. Algorithm 500 includes an identification of the associated system components, and algorithmic processes that are performed by those system components, using algorithms implemented in hardware or a suitable combination of hardware and software. The diagram is exemplary, and other suitable steps, processes, procedures or applications can be utilized in conjunction with the associated process steps.

Algorithm 500 begins at 502, where a handset is located in an LTE coverage area. The algorithm proceeds to 504.

At 504, the handset is set to use the native VoLTE client, such as by handset 102, carrier core network 118, business support systems 126, operation support system 128 or other suitable system components as described herein. The OTT client de-registers, and a flag can be set or other suitable processes can be used to never register the OTT client over LTE during the handset lifetime. The algorithm then proceeds to 506.

At 506, the native VoLTE client is selected as the default client to receive and make a voice call, such as by handset 102, carrier core network 118, business support systems 126, operation support system 128 or other suitable system components as described herein. In one exemplary embodiment, the voice call can be a call that is initiated by the user, but the call can also be an incoming call that is received by the user or other suitable processes can also or alternatively be used, such as three-way or conference calling. The algorithm then proceeds to 508.

At 508, the handset enters a trusted WiFi coverage area. In one exemplary embodiment, the transition can be initiated when the trusted WiFi coverage area has a stronger signal strength than the LTE signal strength, when the trusted WiFi coverage area is greater than a minimum level for a predetermined period of time, or in other suitable manners. The algorithm then proceeds to 510.

At 510, the OTT client is triggered to register into the network, and becomes the default voice client. In one exemplary embodiment, the transition to the WiFi network can include a command to handset 102, carrier core network 118, business support systems 126, operation support system 128 or other suitable system components as described herein, to register the OTT client, or other suitable processes can also or alternatively be used. The algorithm then proceeds to 512.

At 512, the native VoLTE cleat disconnects or is de-registered, such as by handset 102, carrier core network 118, business support systems 126, operation support system 128 or other suitable system components as described herein. In one exemplary embodiment, the transition to the WiFi network can include a command to disconnect or de-register the VoLTE client, such as using a command executed by the handset, a command generated by carrier controlled environment 104 or in other suitable manners.

Although algorithm 500 is shown as a flow chart, the algorithm can be implemented using an objected-oriented process, a state diagram, or other suitable processes. The text portions of the process are incorporated by reference into this disclosure for all purposes.

Figure 6:
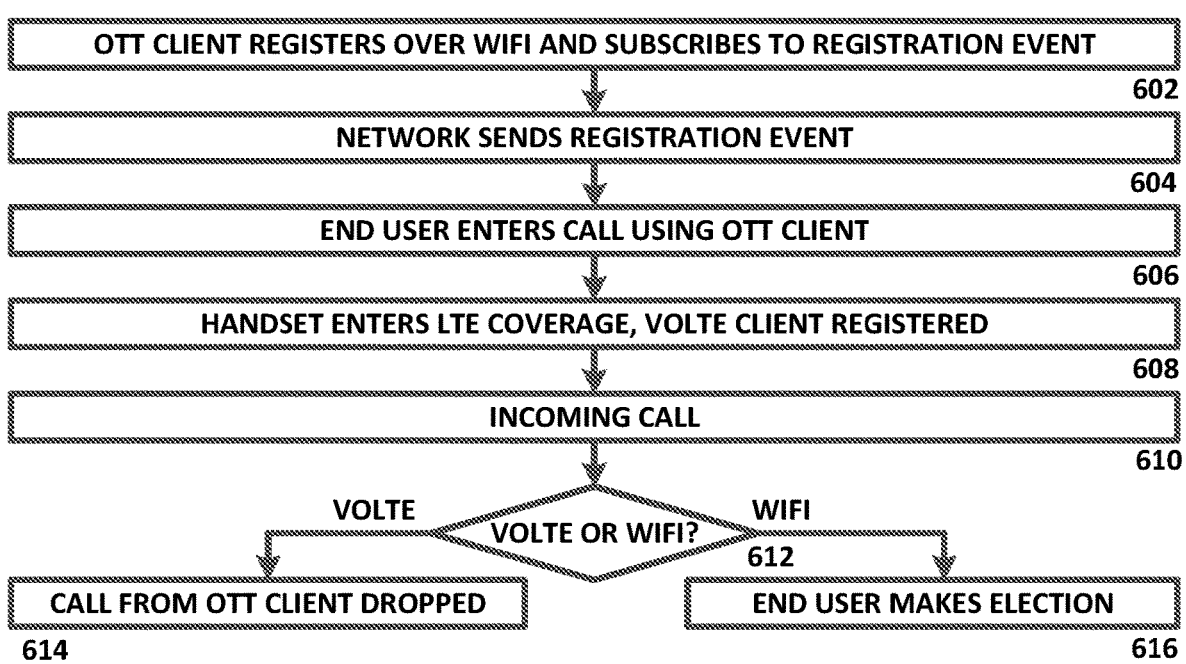
FIG. 6 is a diagram of an algorithm for processing an incoming call when a native VoLTE client enters into an LTE service area and an OTT client is engaged in a call, in accordance with an exemplary embodiment of the present disclosure.

FIG. 6 is a diagram of an algorithm 600 for processing an incoming call when a native VoLTE client enters into an LTE service area and an OTT client is engaged in a call, in accordance with an exemplary embodiment of the present disclosure.

In one exemplary embodiment, when the native VoLTE client has registered through LTE access and the OTT client has registered through WiFi access and been in a call, the following exemplary algorithm can be used to provide a co-existence mechanism. The algorithm includes an identification of the associated system components, and algorithmic processes that are performed by those system components, using algorithms implemented in hardware or a suitable combination of hardware and software. The diagram is exemplary, and other suitable steps, processes, procedures or applications can be utilized in conjunction with the associated process steps.

Algorithm 600 begins at 602, where the OTT client registers over a trusted WiFi network and subscribes to a registration event to get a network notification, such as by using handset 102, carrier core network 118, business support systems 126, operation support system 128 or other suitable system components as described herein. The algorithm then proceeds to 604.

At 604, the network sends a registration event, such as from carrier core network 118, business support systems 126, operation support system 128 or other suitable system components as described herein to handset 102 or other components. The algorithm then proceeds to 606.

At 606, the end user enters a call using the OTT client, such as by using handset 102, carrier core network 118, business support systems 126, operation support system 128 or other suitable system components as described herein. The algorithm then proceeds to 608.

At 608, the handset enters an LTE coverage area, and the VoLTE client is registered, such as by handset 102, carrier core network 118, business support systems 126, operation support system 128 or other suitable system components as described herein. The algorithm then proceeds to 610.

At 610, an incoming call is received over the LTE network. In one exemplary embodiment, the incoming call can be processed using the LTE net in conjunction with carrier core network 118, business support systems 126, operation support system 128 or other suitable system components as described herein. The algorithm then proceeds to 612.

At 612, it is determined whether the VoLTE call or the WiFi call has a higher priority. In one exemplary embodiment, this determination can be made by handset 102, carrier core network 118, business support systems 126, operation support system 128 or other suitable system components as described herein. If it is determined that the VoLTE call has a higher priority, the algorithm proceeds to 614 where the WiFi call is terminated. Otherwise, the algorithm proceeds to 616 and the user makes a selection as to which call to participate in, such as in response to a prompt that is generated during the call, in response to an account setting or in other suitable manners.

Although the process is shown as a flow chart, the process can be implemented in other suitable manners, such as using an objected-oriented process, a state diagram, or other suitable processes. The text portions of the process are incorporated by reference into this disclosure for all purposes.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A method, comprising:
    at a user equipment ("UE") connected to a first network:
        receiving an indication from the first network indicating an incoming voice call;
        determining whether the voice call was successfully connected;
        after it is determined the voice call was successfully connected, receiving a selection function to select between the voice call and a second incoming voice call; and
        switching from the first network to a second network in response to the selection function and further comprising subscribing to a registration event using the UE and an over the top server prior to receiving the indication of the incoming voice call.

2. The method of claim 1, wherein the first network is a Long Term Evolution (LTE) network and the incoming voice call is a Voice over LTE (VoLTE) call processed by the over the top server.

3. The method of claim 2, wherein the second network is a WiFi network configured to interface with the over the top server and the over the top server is configured to de-register if it is determined that a native voice client is a voice over WiFi client.

4. The method of claim 1, further comprising receiving a maintain registration event from an over the top client.

5. The method of claim 1, further comprising responding to the indication from the first network using the over the top server to maintain or de-register an over the top client.

6. The method of claim 1, wherein the function is based on measured properties of a reference signal received by UE from the over the top server.

7. The method of claim 6, wherein the measured properties of the reference signal include a signal strength indicator ("RSSI").

8. A method, comprising: at a user equipment ("UE"): determining whether a selection has been received at the UE to switch a connection from an existing call on a first network to an incoming call on a second network; and when it is determined that the selection has been received, initiating an action by the UE, wherein the action includes one of: re-initiating a connection with a voice over Internet Protocol function of a second network; and setting a status indicator; and subscribing to a registration event at a business support system remote from a carrier controlled environment and using the UE and an over the top server prior to receiving an indication of the incoming voice call.

9. The method of claim 8, wherein the UE had a previous connection to the second network before connecting to the first network.

10. The method of claim 8, further comprising re-initiating a voice over Internet Protocol connection with the second network in coordination with the over the top server and an over the top client.

11. The method of claim 8, wherein the second network is a Long Term Evolution (LTE) network that includes the over the top server and an over the top client.

12. The method of claim 1 further comprising determining whether to receive the incoming voice call on the first network or a second network at the over the top server in communication with an over the top client.

13. The method of claim 1 further comprising determining whether to receive the incoming voice call on the first network or a second network based on a priority associated with the first network at the over the top server.

14. The method of claim 1 further comprising determining whether to receive the incoming voice call on the first network or a second network based on a priority associated with the first network and a priority associated with the second network from the over the top server and using an over the top client.

15. The method of claim 1 further comprising determining whether the voice call was successfully connected at the over the top server using an over the top client.

16. The method of claim 1 further comprising determining whether to receive the incoming voice call on the first network or a second network at the over the top server after receiving the indication from the first network indicating the incoming voice call and prior to determining whether the voice call was successfully connected.

17. The method of claim 1 further comprising determining whether to receive the incoming voice call on the first network or a second network using the over the top server after receiving the indication from the first network indicating the incoming voice call and prior to determining whether the voice call was successfully connected.

18. The method of claim 10 further comprising de-registering the UE from the first network at the over the top server.

* * * * *

UNITED STATES PATENT AND TRADEMARK OFFICE
CERTIFICATE OF CORRECTION

PATENT NO. : 11,743,779 B2
APPLICATION NO. : 16/277159
DATED : August 29, 2023
INVENTOR(S) : Gautam G. Reddy et al.

It is certified that error appears in the above-identified patent and that said Letters Patent is hereby corrected as shown below:

In the Specification

1. In Column 1, Line 20, delete "an." and insert -- an --, therefor.
2. In Column 2, Line 56, delete "other" and insert -- or other --, therefor.
3. In Column 3, Line 41, delete "VoLTE, client" and insert -- VoLTE client --, therefor.
4. In Column 3, Line 66, delete "system." and insert -- system --, therefor.
5. In Column 4, Line 32, delete "system." and insert -- system --, therefor.
6. In Column 4, Line 47, delete "client." and insert -- client --, therefor.
7. In Column 5, Line 1, delete "voice" and insert -- voice calling --, therefor.
8. In Column 6, Line 10, delete "and will" and insert -- and this will --, therefor.
9. In Column 6, Line 22, delete "get one" and insert -- get --, therefor.
10. In Column 6, Line 23, delete "In exemplary" and insert -- In one exemplary --, therefor.
11. In Column 7, Line 41, delete "Win" and insert -- WiFi --, therefor.
12. In Column 10, Line 30, delete "cleat" and insert -- client --, therefor.
13. In Column 11, Line 19, delete "LTE net" and insert -- LTE network --, therefor.

In the Claims

14. In Column 12, Line 32, in Claim 8, delete "the incoming voice call." and insert -- an incoming voice call. --, therefor.

Signed and Sealed this
Eleventh Day of June, 2024

Katherine Kelly Vidal
*Director of the United States Patent and Trademark Office*